United States Patent [19]

Morean et al.

[11] 4,122,461

[45] Oct. 24, 1978

[54] EXPOSURE APPARATUS AND METHOD FOR MANUFACTURING A CATHODE RAY TUBE DISPLAY SCREEN

[75] Inventors: James E. Morean, Coudersport, Pa.; Carl W. Penird, Waterloo, N.Y.

[73] Assignee: GTE Sylvania Incorporated, Stamford, Conn.

[21] Appl. No.: 814,146

[22] Filed: Jul. 11, 1977

[51] Int. Cl.[2] .................... G03B 41/00; G03C 5/00; G03B 9/40

[52] U.S. Cl. .................................. 354/1; 96/36.1; 354/246

[58] Field of Search .................. 354/1, 246, 248, 249; 96/36.1

[56] References Cited

U.S. PATENT DOCUMENTS

| | | | |
|---|---|---|---|
| 3,287,130 | 11/1966 | Kaplan | 96/36.1 |
| 3,395,628 | 8/1968 | Kautz et al. | 354/1 |
| 3,559,546 | 2/1971 | MeKee | 354/1 |
| 3,664,295 | 5/1972 | Ng et al. | 354/1 UX |
| 3,760,698 | 9/1973 | Fujimura | 354/1 |
| 3,810,196 | 5/1974 | Barten | 354/1 |
| 3,828,358 | 8/1974 | Miyaoka | 354/1 |
| 3,848,983 | 11/1974 | Fridrich | 354/1 |
| 3,900,854 | 8/1975 | Osakabe et al. | 354/1 |
| 3,906,515 | 9/1975 | Hosokoshi et al. | 96/36.1 X |
| 3,946,414 | 3/1976 | Kitai | 354/246 X |
| 3,949,411 | 4/1976 | Yonai et al. | 354/1 |
| 3,982,252 | 9/1976 | Yamazaki et al. | 354/1 |

*Primary Examiner*—Donald A. Griffin

*Attorney, Agent, or Firm*—Thomas H. Buffton

[57] ABSTRACT

Apparatus for manufacturing cathode ray tube display screens having a face plate with an affixed layer of photosensitive material and an apertured mask spaced from the photosensitive layer and attached to the faceplate includes an exposure chamber having a source of actinic energy spaced from the faceplate and a shutter intermediate the actinic energy source and the faceplate with the shutter movable in one given direction to initiate and to interrupt impingement of the faceplate by light rays from the actinic energy source.

In a process for fabricating cathode ray tube display screens, a faceplate having a layer of photosensitive material on the inner surface and an apertured mask spaced from the photosensitive material and affixed to the faceplate is disposed on and supported by an exposure chamber having a source of actinic energy spaced from the faceplate with a shutter intermediate the energy source and the faceplate and the shutter movable in a given direction to cause light rays from the energy source to impinge the faceplate and movable in the same given direction to interrupt impingement of the faceplate by light rays from the energy source.

10 Claims, 8 Drawing Figures

EXPOSURE APPARATUS AND METHOD FOR MANUFACTURING A CATHODE RAY TUBE DISPLAY SCREEN

BACKGROUND OF THE INVENTION

This invention relates to cathode ray tubes and more particularly to apparatus and a method for manufacturing cathode ray tube screens.

In the manufacture of screens for cathode ray tubes and especially in the utilization of a light to expose a pattern of photosensitive material in the fabrication of color cathode ray tubes, it has been a common practice to provide a primary light source which is used to provide a secondary or point source of light. Such an optical system ordinarily utilizes a "light pipe" or quartz rod to effect light transmission. However, due to internal reflections, it is not unexpected that a large portion of the intensity of the primary light source is lost in such optical system processing.

Also, it has been conventional practice in the manufacture of color cathode ray tube viewing screens to employ a faceplate for the cathode ray tube with a layer of photosensitive material and color emitting phosphors on the inner surface of the faceplate. An apertured mask is affixed to the faceplate and spaced from the layer of photosensitive material and color emitting phosphors.

The faceplate is placed on a screen exposure apparatus, referred to as a "lighthouse", and the light source is disposed within the "lighthouse" and spaced from the faceplate. A correction lens for directing the light rays from the light source to the faceplate as well as a light inhibiter or "shader" are disposed intermediate the light source and the faceplate and serve to control light ray impingement of the faceplate. Moreover, a shutter is disposed intermediate the light source and the lens and "shader" and utilized to initiate or interrupt light beams emanating from the light source to either permit or inhibit impingement of the faceplate by the light beams.

In this manner actinic energy from the light source is directed by the lens and "shader" and caused to pass through the apertures of the mask to impinge the photosensitive layer of the faceplate. Thereupon, specific portions of the photosensitive layer are hardened and the unexposed and unhardened portions removed as by washing. Also, the technique is repeated by altering the positional location of the light source with respect to the faceplate to provide matrix windows or phosphor-adhering portions formed for impingement by electron beams of a cathode ray tube.

Although the above-described manufacturing technique has been and still is utilized to provide patterned screens for cathode ray tubes, it has been found that certain difficulties are encountered. For example, it has been found that optic systems utilizing primary and secondary light sources or a "light pipe" require something in the neighborhood of a one kilowatt primary light source due to the attenuation of the "light pipe". As a result, an elaborate cooling system is required to keep the lamp operational and such systems are both expensive and cumbersome.

Also, cathode ray tube screens for so-called "dot" or delta screens required a point source of light to effect correct exposure. To achieve such a point source, the so-called "light pipe" technique was a necessity. However, fabrication of an inline type of color cathode ray tube does not require a point source of light whereupon a direct viewing light source of greatly reduced energy requirements is possible and desirable. Moreover, such a direct viewing light source is preferably movable to provide proper effective source length to insure straight matrix windows or phosphor lines.

Furthermore, exposure time for the indirect or "light pipe" type of system was frequently counted in terms of minutes whereas a direct viewing system, having an optic system with up to ten magnitudes of increased light capability, operates with an exposure time counted in terms of seconds. As a result, prior techniques whereby a shutter was indexed into and indexed back out of the light source path are no longer satisfactory. In other words, the shortness of exposure time requires a precision type of shutter operation in order to effect the desired uniformity of exposure throughout the entire faceplate.

OBJECTS AND SUMMARY OF THE INVENTION

An object of the present invention is to reduce the above-mentioned difficulties and provide an enhanced capability for optical exposure of color cathode ray tube screens. Another object of the invention is to provide "lighthouse" apparatus and a technique for improved exposure of a color cathode ray tube screen. Still another object of the invention is to provide an exposure "lighthouse" apparatus having an improved direct light source which is water cooled and movable and an improved shutter for cooperation therewith to provide initial light beam impingement and interruption of light beam impingement of the faceplate at substantially the same positional location of the faceplate. A further object of the invention is to provide an improved method for exposing a pattern on a photosensitive layer of material affixed to the inner surface of a faceplate for a cathode ray tube.

These and other objects, advantages and capabilities are achieved in one aspect of the invention by an exposure chamber having a faceplate with a layer of photosensitive material on the inner surface thereof spaced from a direct light source which is water cooled and formed to oscillate with a shutter disposed intermediate the light source and face panel and formed to move in one give direction to effect both initiation of and interruption of impingement of said face panel by the rays from the light source.

The exposure is effected by a process wherein the faceplate is supported by an exposure apparatus having a source of actinic energy spaced from the faceplate and emitting light rays and a shutter intermediate the actinic energy source and the faceplate with the shutter moving in one given direction to effect impingement and interrupt impingement of the faceplate by the light rays.

DESCRIPTION OF THE PREFERRED EMBODIMENT

For a better understanding of the present invention, together with other and further objects, advantages and capabilities thereof, reference is made to the following disclosure and appended claims in connection with the accompanying drawings.

Figure 1:
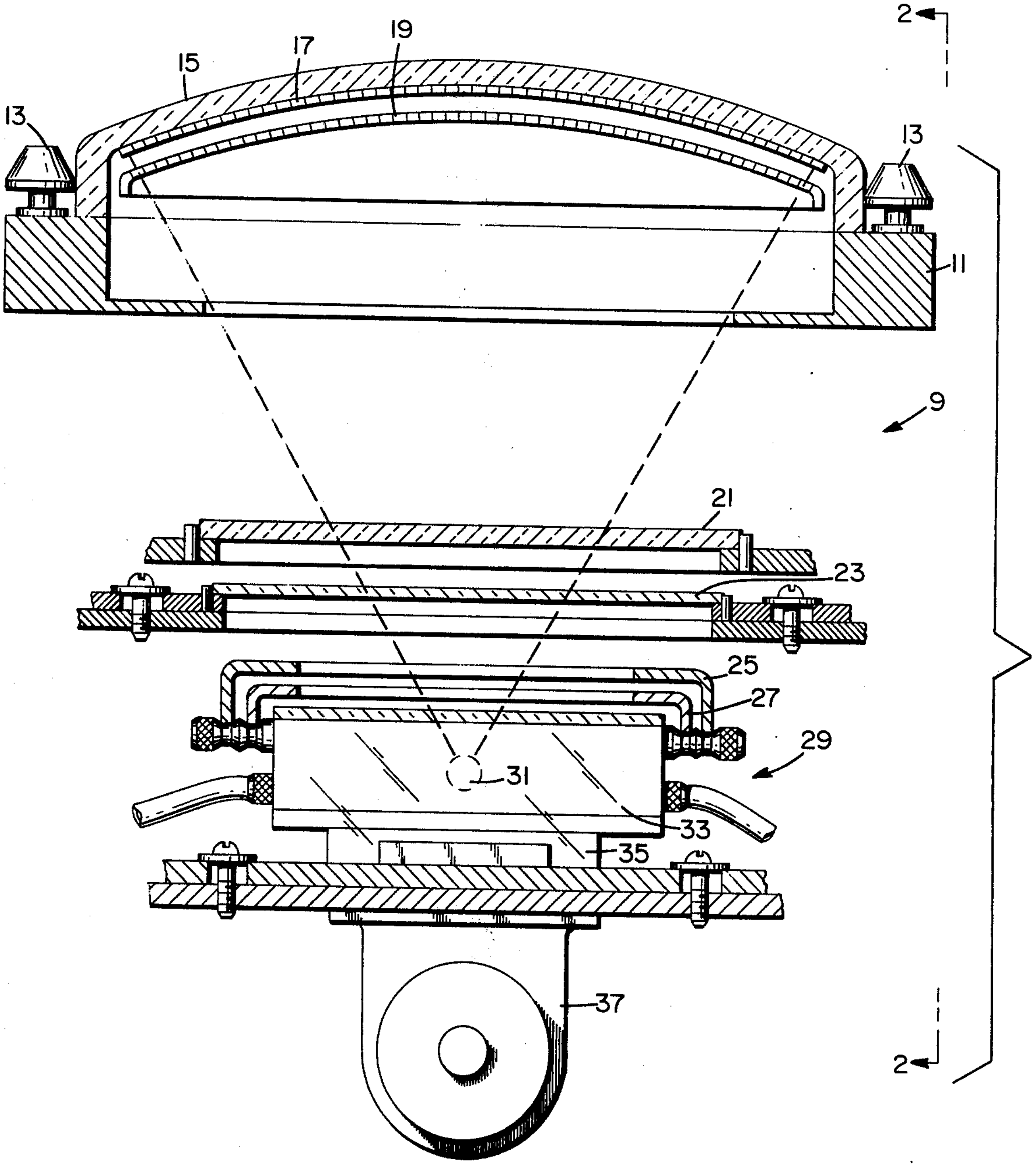
FIG. 1 is a diagrammatic illustration of a preferred form of "lighthouse" exposure apparatus for cathode ray tube screen manufacture.
Figure 2:
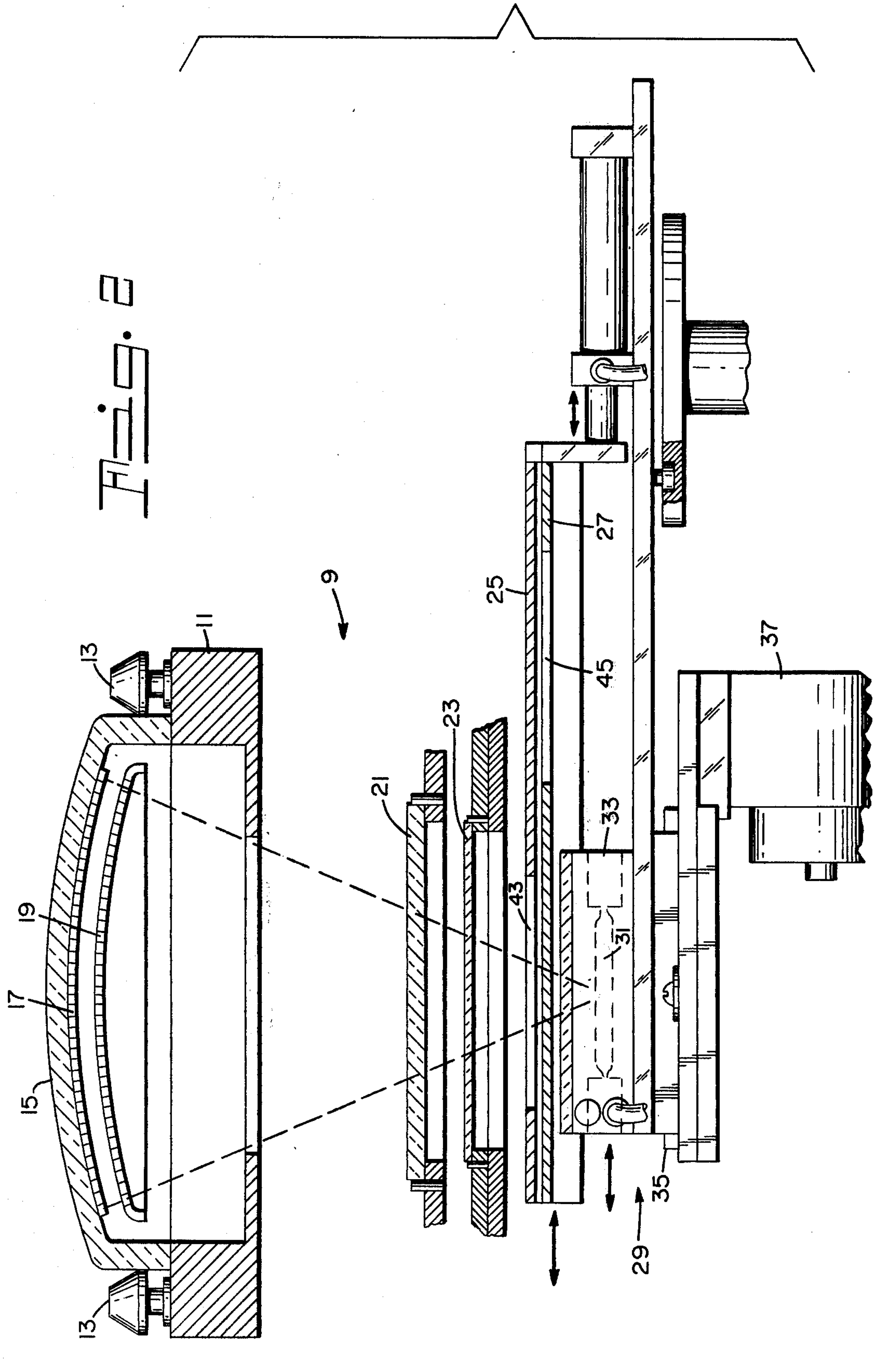
FIG. 2 is a side view of the illustration of FIG. 1.

Referring to FIGS. 1 and 2 of the drawings, a "lighthouse" 9 includes a support member 11 having a pair of mounted rubber guide members 13. A cathode ray tube faceplate 15 is rested upon the support member 11 and positionally located by the guide members 13. The cathode ray tube faceplate 15 has a layer 17 of photosensitive material affixed to the inner surface thereof and a perforated mask member 19 is affixed to the faceplate 15 and spaced from the layer of photosensitive material 17.

Figure 3:
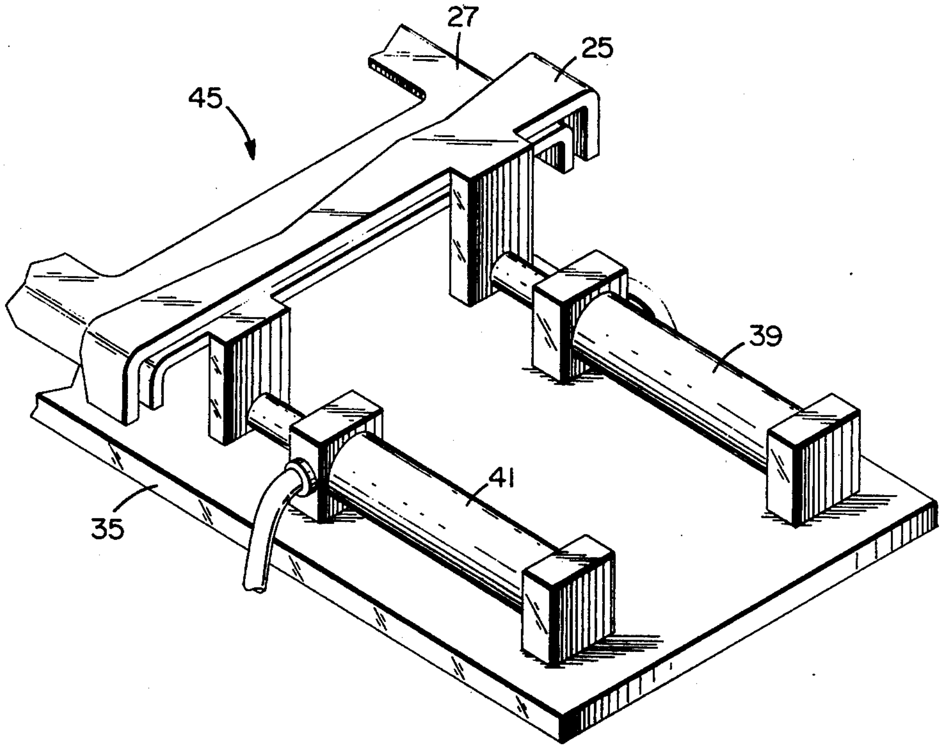
FIG. 3 is a top view illustrating the operation of a shutter mechanism of the apparatus of FIG. 1.

Within the "lighthouse" 9 and spaced from the perforated mask member 19 is a corrective lens 21, a shader plate 23, first and second shutters 25 and 27 and a light source 29 respectively. As can be seen more clearly in FIG. 2, the light source 29 includes a lamp 31 having a longitudinal axis and sealed within a water-cooled chamber 33. The water-cooled chamber 33 is affixed to a ball-slide 35 which is operable by a motor 37. Also, each of the first and second shutters 25 and 27 is connected to an air cylinder 39 and 41 of FIG. 3 and includes an aperture 43 and 45 of FIG. 2.

As to operation of the above-described apparatus, the faceplate 15 having a layer 17 of photosensitive material and a perforated mask member 19 affixed thereto is deposited onto the support member 11 and positionally located by the guide members 13. The light source 29 is activated which includes energization of the lamp 31, which is preferably a 1200 watt mercury vapor lamp for example, and application of a cooling water flow in an amount sufficient to maintain a lamp temperature of about 60° F. Also, the motor 37 is activated and causes the lamp 31 to oscillate along the longitudinal axis thereof at a rate which may be in the range of one oscillation per sec.

Figure 4:
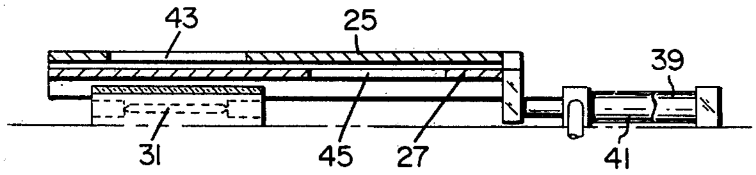
FIGS. 4–8 illustrate the operation of the shutter apparatus of FIG. 1.

Thereafter, the first and second shutters 25 and 27 are activated in a manner which is more readily understood by reference to FIGS. 4–8. In FIG. 4, the first and second shutters 25 and 27 have apertures 43 and 45 which are mis-aligned with respect to the lamp 31. Thus, light rays emanating from the lamp 31 are blocked by the second shutter 27 and exposure of the photosensitive material layer 17 is inhibited.

Figure 5:
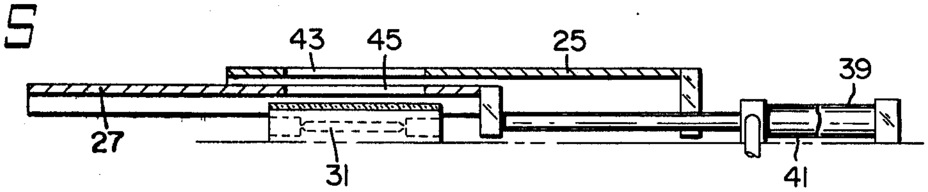

However, to effect exposure or impingement of the photosensitive material layer 17 by the light rays, reference is made to FIG. 5. Therein, the second shutter 27 has been moved in a given direction to cause alignment of the apertures 43 and 45. Thus, light rays emanating from the lamp 31 are permitted to impinge the photosensitive material layer 17.

Figure 6:
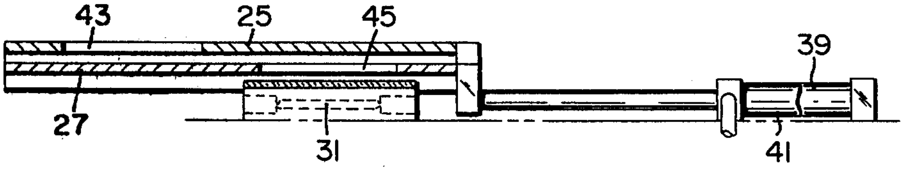

In order to discontinue exposure or impingement of the photosensitive material layer 17 by the light rays, reference is made to FIG. 6. Therein, the first shutter 25 is moved in the same direction as the direction of the second shutter 27 movement to effect exposure. Also, the first shutter 25 is moved in the given direction in an amount sufficient to cause mis-alignment of the apertures 43 and 45 and interruption of the light rays emanating from the lamp 31. Thus, it is to be noted that the first portion of the photosensitive material layer 17 to receive light rays from the lamp 31 is also the first portion whereat the light rays are discontinued. In other words, the first portion exposed is the first portion whereat exposure is discontinued.

Figure 7:
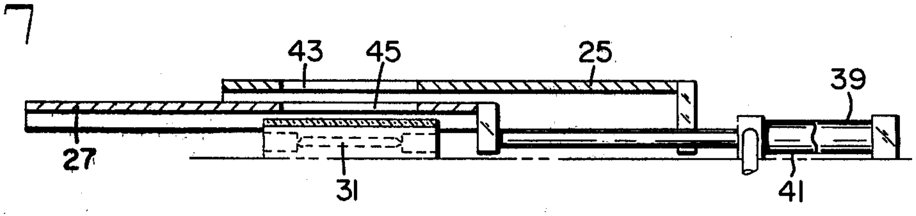
Figure 8:
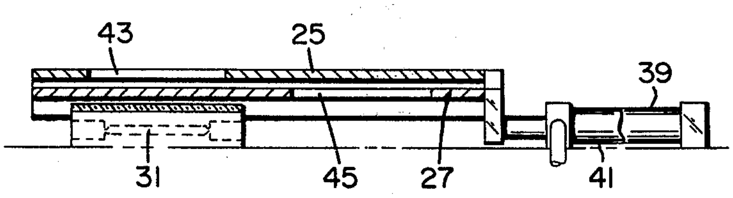

As a further sequence, FIG. 7 illustrates exposure of the photosensitive material layer 17 by advancement of the first shutter 25 in a given direction to effect alignment of the apertures 43 and 45. Moreover, FIG. 8 illustrates discontinuance of exposure by movement of the second shutter 27 in the same direction as the previous movement of the first shutter 25 to effect exposure. In other words, the second aperture 45 is mis-aligned with the first aperture 43 by movement of the second shutter 27 in the same direction as the first shutter 25 was moved to effect exposure.

Thus, a water-cooled oscillating direct light source 29 is utilized with a pair of shutters 25 and 27, a shader 23, and a corrective lens 21 to effect exposure of a photosensitive material layer 17 on the inner surface of a faceplate 15. Since the light source 29 is a direct source, rather than an indirect or quartz rod and lamp technique frequently employed to provide a point source of light, it has been found that exposure time can be drastically reduced whereupon the exposure technique becomes more critical.

Specifically, previous indirect forms of exposure utilizing a quartz rod to provide a point source of light quite often utilized an exposure time in the neighborhood of 3–5 minutes. In contrast, the above-described direct light exposure technique quite often employs an exposure time of about 15–30 seconds. Obviously, the operation of the exposure effecting apparatus or shutter is of much less significance when exposures are 3–5 minutes than when they are 15–30 seconds.

Thus, there has been provided a unique "lighthouse" apparatus and method for effecting exposure of a photosensitive layer of material on the inner surface of the faceplate of a cathode ray tube. The enhanced apparatus provides not only a direct, oscillating and water-cooled light source but also a shutter technique for effecting exposure wherein the first portion of the photosensitive material exposed is also the first portion wherefrom exposure is discontinued. As a result, fast, efficient and uniform exposure of a photosensitive layer is enhanced with a resultant improved technique for cathode ray tube fabrication.

While there has been shown and described what are at present considered the preferred embodiments of the invention, it will be obvious to those skilled in the art that various changes and modifications may be made therein without departing from the invention as defined by the appended claims.

What is claimed is:

1. In an exposure chamber for exposing specific portions of a layer of photosensitive coating affixed to the inner surface of a cathode ray tube face panel having an apertured mask attached thereto and spaced from the photosensitive coating layer wherein the face panel is spaced from a direct source of actinic energy directing light rays toward the photosensitive coating on the face panel, the improvement comprising a shutter means disposed intermediate the photosensitive coating on the face panel and the direct source of actinic energy, said shutter means being in the form of first and second shutter members and movable in one given direction substantially normal to the direction of said light rays to effect both initial impingement and initial interruption of impingement of the same portion of said photosensitive coating on said face panel by said light rays.

2. The exposure chamber in accordance with claim 1 wherein said source of actinic energy is in the form of a direct viewing light source, sealed in a liquid-filled enclosure and oscillated at a pre-determined frequency in a direction parallel to the longitudinal axis of the light source.

3. The exposure chamber in accordance with claim 1 wherein a light attenuator means is disposed intermediate said shutter means and said faceplate and a light correcting lens is disposed intermediate said light attenuator means and said faceplate.

4. An exposure chamber for photoexposing an inline cathode ray tube face panel having a layer of photosensitive material on the inner surface thereof and an apertured mask affixed to the face panel and spaced from the layer of photosensitive material, said chamber comprising:

an apertured member for supporting said face panel;

a direct source of actinic energy spaced from and emanating light rays toward said apertured member supporting said face panel;

a shutter disposed intermediate the direct sourc of actinic energy and said apertured member for supporting said face panel, said shutter being in the form of first and second members each having an aperture and formed to move in the same given direction to effect both alignment and mis-alignment of the aperture and impingement and interruption of impingement of said face panel by said light rays.

5. The chamber of claim 4 wherein said shutter is in the form of planar member in a direction normal to a longitudinal axis extending through said direct source of actinic energy and said faceplate of said cathode ray tube.

6. The chamber of claim 4 wherein said direct source of actinic energy is immersed in a liquid-filled enclosure and oscillated in the direction of the longitudinal axis thereof and a light attenuator and a light correcting lens are respectively disposed intermediate said shutter and said base plate of said cathode ray tube.

7. In an apertured chamber having a direct source of actinic energy directing light rays toward first and second shutter members each having an aperture and movable in the same direction, a method for exposing a pattern on a photosensitive layer affixed to the inner surface of the face panel of a cathode ray tube having a perforated mask member spaced from the photosensitive layer comprising the steps of:

supporting said face panel on said apertured chamber with said photosensitive layer toward said direct source of actinic energy;

activating said direct source of actinic energy to effect emitted light rays directed toward said photosensitive layer;

moving a first one of said first and second shutter members in a given direction to effect alignment of said apertures of said first and second shutter members and impingement of said photosensitive layer by said light rays from said direct source of actinic energy; and moving a second one of said first and second shutter members in said same given direction to effect non-alignment of said apertures of said first and second shutter members and non-impingement of said photosensitive layer by said light rays from said direct source of actinic energy whereby the initially impinged portion is the initially non-impinged portion of said photosensitive layer.

8. The method of claim 7 wherein said direct source of actinic energy is disposed within a liquid-filled container.

9. The method of claim 7 wherein said direct source of actinic energy is in the form of a mercury lamp having a longitudinal axis and is oscillated in a direction along said longitudinal axis.

10. The method of claim 7 wherein said exposure chamber includes a direct source of actinic energy sealed in a liquid-filled container and moved in the direction of the longitudinal axis of said source, an attenuator spaced intermediate said source and said faceplate, a correction lens spaced intermediate said attenuator and said faceplate and a shutter disposed intermediate said source and said attenuator and movable in a given direction to cause light rays from said source to impinge said faceplate and in said same give direction to cause interruption of impingement of said faceplate by light rays from said source.

* * * * *

UNITED STATES PATENT AND TRADEMARK OFFICE

CERTIFICATE OF CORRECTION

PATENT NO. : 4,122,461

DATED : October 24, 1978

INVENTOR(S) : James E. Morean and Carl W. Penird

It is certified that error appears in the above-identified patent and that said Letters Patent are hereby corrected as shown below:

Col. 5, line 27 - After "member" and before "in", please insert -- movable --.

Signed and Sealed this

*Sixth* Day of *February 1979*

[SEAL]

*Attest:*

RUTH C. MASON
*Attesting Officer*

DONALD W. BANNER
*Commissioner of Patents and Trademarks*